United States Patent
Howard et al.

(10) Patent No.: US 7,377,419 B1
(45) Date of Patent: May 27, 2008

(54) BRAZING OPEN CELL RETICULATED COPPER FOAM TO STAINLESS STEEL TUBING WITH VACUUM FURNACE BRAZED GOLD/INDIUM ALLOY PLATING

(75) Inventors: Stanley R. Howard, Windsor, SC (US); Paul S. Korinko, Aiken, SC (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 261 days.

(21) Appl. No.: 11/017,544

(22) Filed: Dec. 22, 2004

Related U.S. Application Data

(60) Provisional application No. 60/559,289, filed on Apr. 1, 2004.

(51) Int. Cl.
    *B23K 31/00* (2006.01)
(52) U.S. Cl. .................. 228/221; 29/890.054; 428/550
(58) Field of Classification Search ................ 228/221; 29/890.054; 428/550
    See application file for complete search history.

(56) References Cited

U.S. PATENT DOCUMENTS

| | | | | |
|---|---|---|---|---|
| 2,813,790 A | * | 11/1957 | Hack | 420/512 |
| 3,412,458 A | * | 11/1968 | Delnero | 228/170 |
| 3,683,488 A | * | 8/1972 | Cook et al. | 228/181 |
| 3,769,101 A | * | 10/1973 | Woodward | 148/528 |
| 3,778,254 A | * | 12/1973 | Cole et al. | 420/10 |
| 4,270,986 A | * | 6/1981 | Smith | 205/206 |
| 4,706,256 A | * | 11/1987 | Sheng et al. | 372/61 |
| 4,926,647 A | * | 5/1990 | Dorri et al. | 62/51.1 |
| 5,419,156 A | * | 5/1995 | Sywulka | 62/476 |
| 5,814,880 A | * | 9/1998 | Costello et al. | 257/678 |
| 5,943,543 A | | 8/1999 | Uchida et al. | |

* cited by examiner

*Primary Examiner*—Kevin P. Kerns
*Assistant Examiner*—Michael Aboagye
(74) *Attorney, Agent, or Firm*—Esther L. Roberts; Paul A. Gottlieb

(57) ABSTRACT

A method of fabricating a heat exchanger includes brush electroplating plated layers for a brazing alloy onto a stainless steel tube in thin layers, over a nickel strike having a 1.3 μm thickness. The resultant Au-18 In composition may be applied as a first layer of indium, 1.47 μm thick, and a second layer of gold, 2.54 μm thick. The order of plating helps control brazing erosion. Excessive amounts of brazing material are avoided by controlling the electroplating process. The reticulated copper foam rings are interference fit to the stainless steel tube, and in contact with the plated layers. The copper foam rings, the plated layers for brazing alloy, and the stainless steel tube are heated and cooled in a vacuum furnace at controlled rates, forming a bond of the copper foam rings to the stainless steel tube that improves heat transfer between the tube and the copper foam.

4 Claims, 3 Drawing Sheets

BRAZING OPEN CELL RETICULATED COPPER FOAM TO STAINLESS STEEL TUBING WITH VACUUM FURNACE BRAZED GOLD/INDIUM ALLOY PLATING

STATEMENT REGARDING PRIORITY

This invention claims the benefit of U.S. Provisional Application No. 60/559,289 filed Apr. 1, 2004.

STATEMENT REGRADING FEDERALLY SPONSORED RESEARCH OR DEVELOPMENT

This invention was made with Government support under United States Department of Energy Contract No. DE-AC09-96SR18500 awarded by the United States Department of Energy. The Government has certain rights in this invention.

BACKGROUND OF THE INVENTION

The present invention generally relates to fabrication of heat exchangers and, more particularly, to a method for brazing open cell reticulated foam pieces to stainless steel tubing.

A thermal cycling absorption process (TCAP) is currently used to separate and purify hydrogen isotopes from hydrogen gas. The TCAP process uses differences in absorption properties in palladium to separate the low mass and high mass isotopes. The TCAP unit uses heat exchangers in part of the process to derive product (high mass isotopes) and raffinate (low mass isotopes). It is possible to purify hydrogen isotopes to the tens of parts per million (ppm) range using the TCAP technology. Although the TCAP process has been used successfully for a number of years, there is a possibility for significant improvement in cycle time and thermal efficiency by changing the heating and cooling medium from gaseous nitrogen to a thermal fluid. This change in thermal media requires significant changes in equipment design.

The improved TCAP heat exchanger uses a tube-in-tube (TnT) configuration in which an inner tube is surrounded by an outer tube with an annular space between the tubes. The thermal fluid is contained within the inner tube and the hydrogen gas, which is to be heated and cooled, is circulated in the annular space between the tubes. A vacuum jacket may surround the outer tube. The palladium used for adsorption/desorption fills the annular space. The palladium may be in the form of particles or pellets of palladium coated kieselguhr, as known in the art. The TCAP process cycles between approximate −25 and 125° C. Decreasing the duration of the cycle will increase the throughput of impure gas and increase the productivity of the system. The desire for a rapid change in temperature of the system and an improvement in overall heat transfer may be achieved by adding high thermal conductivity metal to the tube-in-tube TCAP annular space and will improve the efficiency, however, it is also desirable to keep the overall thermal mass as low as possible to maximize the heating and cooling of the product gases, rather then the process hardware.

The addition of copper foam into the annular space could improve the thermal properties of the heat exchanger. The copper foam could be friction fit onto the inner tube or metallurgically bonded to the inner tube for improved heat transfer to the palladium coated kieselguhr particles. Bonding to both inner and outer tubes does not appear feasible, however, due to potential thermal fatigue problems from thermal expansion and contraction differences in which the foam would likely fracture.

The open cell structure of one particular type of copper foam results in a relative density of the foam versus solid copper of about 6.5-9.5%, i.e., less than one-tenth the density of solid copper. Prior art techniques used for bonding solid copper to stainless steel have generally not proved successful for metallurgically bonding copper foam to stainless steel tubing. Typical prior art braze alloy placement techniques may introduce problems such as excessive braze material (with foil), introduction of organic binder materials (with paste) or additional required heating cycles (with other precoats). The excessive braze material produced by prior art brazing techniques may be unsuitable due to problems with braze pooling, braze wrinkling, braze blistering, and brazing erosion, i.e., alloying of the braze with the copper to produce a low melting point alloy that melts the filament resulting in a loss of contract during brazing. This significantly reduces the heat transfer between the inner tube and copper foam, and therefore reduces the heat transfer between the thermal fluid and palladium particles in the TnT application. This may also result in inadequate total bond strength.

For high temperature brazes, (for example, at temperatures above about 800° C.) additional problems are encountered. For example, the outer portion of the copper foam may be crushed inside the outer tube due to thermal coefficient of expansion mismatch as the cooper foam in the annular space expands much more when heated than does the surrounding outer stainless steel tube. Under the high temperature, the copper foam may also be subject to creep deformation, causing the copper foam to separate from the inner surface and lose contact with the tube. Partial melting of the copper foam may occur at brazing temperatures in the range of 980° C. if the copper foam becomes contaminated with other materials (melting point of pure copper is 1085° C.). To be successful, a brazing technique should produce a wetted surface on the tube or structure to which the copper foam is to be bonded, the ligaments of the copper foam should be bonded without brazing erosion of the copper foam, and the braze joints should be stronger than the filaments, i.e., the filaments themselves should break before the braze joints under destructive axial load testing.

As can be seen, there is a need to metallurgically bond copper foam to other metals, such as stainless steel, that produces a strong bond without braze erosion or the other problems described above. There is a need for a low temperature (<700° C.) brazing technique to avoid damage from creep deformation and thermal expansion mismatch between the foam and the stainless steel.

SUMMARY OF THE INVENTION

In one aspect of the present invention, a method for brazing an open cell reticulated copper foam to a stainless steel tube includes steps of: brush electroplating elemental layers onto the stainless steel tube to produce metal coatings that will be melted into a braze alloy; positioning the cooper foam in mechanically stable contact with the plating on the stainless steel tube; heating the plating in a vacuum furnace; and forming a brazing alloy which then bonds the copper foam to the stainless steel tube.

In another aspect of the present invention, a method of fabricating a heat exchanger includes steps of: brush electroplating a nickel strike having a 1.3 µm thickness onto a stainless steel tube before brush electroplating layers of elemental metals in proportions that will yield a brazing alloy having a normal Au-18 In (gold 18 weight percent indium) composition; brush electroplating over the nickel strike a first layer of indium to a targeted thickness of 1.47 µm by controlling plating time and current in accord with Faraday's equation; and brush electroplating over the first layer of indium a second layer of gold to a targeted thickness of 2.54 µm by controlling plating time and current in accord with Faraday's equation. The method also includes positioning a copper foam ring with an interference fit in contact with the braze plating on the stainless steel tube.

The method further includes heating the copper foam ring, the plated layers for the brazing alloy, and the stainless steel tube in a vacuum furnace below a maximum pressure of $10^{-5}$ Torr including steps of: heating the copper foam ring, the plated layers for the brazing alloy, and the stainless steel tube from room temperature to the targeted 150° C. at 20° C. per minute, and holding the copper foam ring, the plated layers for the brazing alloy, and the stainless steel tube at the targeted 150° C. for 30 minutes; heating the copper foam ring, the plated layers for the brazing alloy, and the stainless steel tube from the targeted 150° C. to 530° C. at 20° C. per minute; heating the copper foam ring, the plated layers for the brazing alloy, and the stainless steel tube from the targeted 530° C. to 550° C. at 3° C. per minute, and holding the copper foam ring, the plated layers for the brazing alloy, and the stainless steel tube at the targeted 550° C. for 15 minutes to allow the braze plating layers to melt and alloy, and to flow onto the stainless steel tubing and copper foam to form the metallurgical bond; and cooling the cooper foam ring, the resultant brazing alloy, and the stainless steel tube from the targeted 550° C. down to 100° C. at a rate not exceeding 20° C. per minute; thus forming a bond of the copper foam ring to the stainless steel tube.

In still another aspect of the present invention, a method for brazing includes step of: brush plating onto a structure plated layers of elemental constituent that produce a brazing alloy as a product; positioning a copper foam in contact with one of the plated layers of elemental constituent of the brazing alloy on the structure; and heating the plated layers of elemental constituent of the brazing alloy in a vacuum furnace to form a bond of the copper foam to the structure.

In yet another aspect of the present invention, a method for brazing a copper foam to a stainless steel structure includes steps of: brush plating layers for a brazing alloy onto the stainless steel structure; positioning the copper foam in mechanically stable contact with at least one of the plated layers for the brazing alloy on the stainless steel structure; and heating the plated layers for the brazing alloy in a vacuum furnace and forming a bond of the copper foam to the stainless steel structure.

In a further aspect of the present invention, a heat exchanger is produced by steps of: brush electroplating plated layers of elemental constituents for a brazing alloy onto a stainless steel tube; positioning an open cell reticulated copper foam ring in mechanically stable contact with the plated layers for the brazing alloy on the stainless steel tube; heating the plated layers for the brazing alloy in a vacuum furnace; and forming a bond of the open cell reticulated copper foam ring to the stainless steel tube.

In a still further aspect of the present invention, a stainless steel structure has copper foam brazed to the stainless steel structure according to the steps of: brush plating layers for a brazing alloy onto the stainless steel structure; positioning the copper foam in mechanically stable contact with the brazing alloy on the stainless steel structure; and heating the brazing alloy in a vacuum furnace and forming a bond of the copper foam to the stainless steel structure.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, one embodiment of the present invention provides a method for brazing copper foam to stainless steel that provides a strong metallurgical bond without damage, such as excessive brazing erosion, to the copper foam. In one embodiment, the method may be especially useful for the fabrication of tube-in-tube (TnT) heat exchangers employed by thermal cycling absorption process (TCAP) units used to separate and purify hydrogen isotopes in an isotopically mixed hydrogen gas. Other embodiments may find commercial use in industries that use stainless steel process materials that would benefit from improved heat transfer characteristics. For example, one embodiment could be used to braze the reticulated copper foam to a heat exchanger for use as "cooling fins." In particular, the brazing of cooper foam to stainless steel for use in hydride processes and hydrogen storage are most likely commercial uses of embodiments of the present invention.

One embodiment of the present invention may provide low temperature brazing of copper foam to stainless steel that does not damage the copper foam or exhibit excessive brazing erosion, in contrast to prior art brazing techniques that typically result in approximately ten times more braze material than needed for the low density copper foam, and exhibit problems of braze pooling, braze wrinkling, and braze blistering that significantly weaken the copper foam, and produce a weak bond or no bond. In one embodiment, a brazing method may produce a wetted surface of the tube or structure to which the copper foam is to be bonded, the ligaments of the copper foam may be bonded without excessive braze erosion of the copper foam, and the bonds may be stronger than the filaments of the copper foam, as demonstrated by destructive testing in which torn copper foam ligaments remained attached to the tube after the remainder of the copper foam had been pushed off the tube. A workable method—such as provided by one embodiment of the present invention—of intimately bonding copper foam to stainless steel tubing in a heat exchanger requiring unseparated gas flow—such as the TCAP TnT heat exchanger—has not been evidenced in the prior art.

Figure 1:
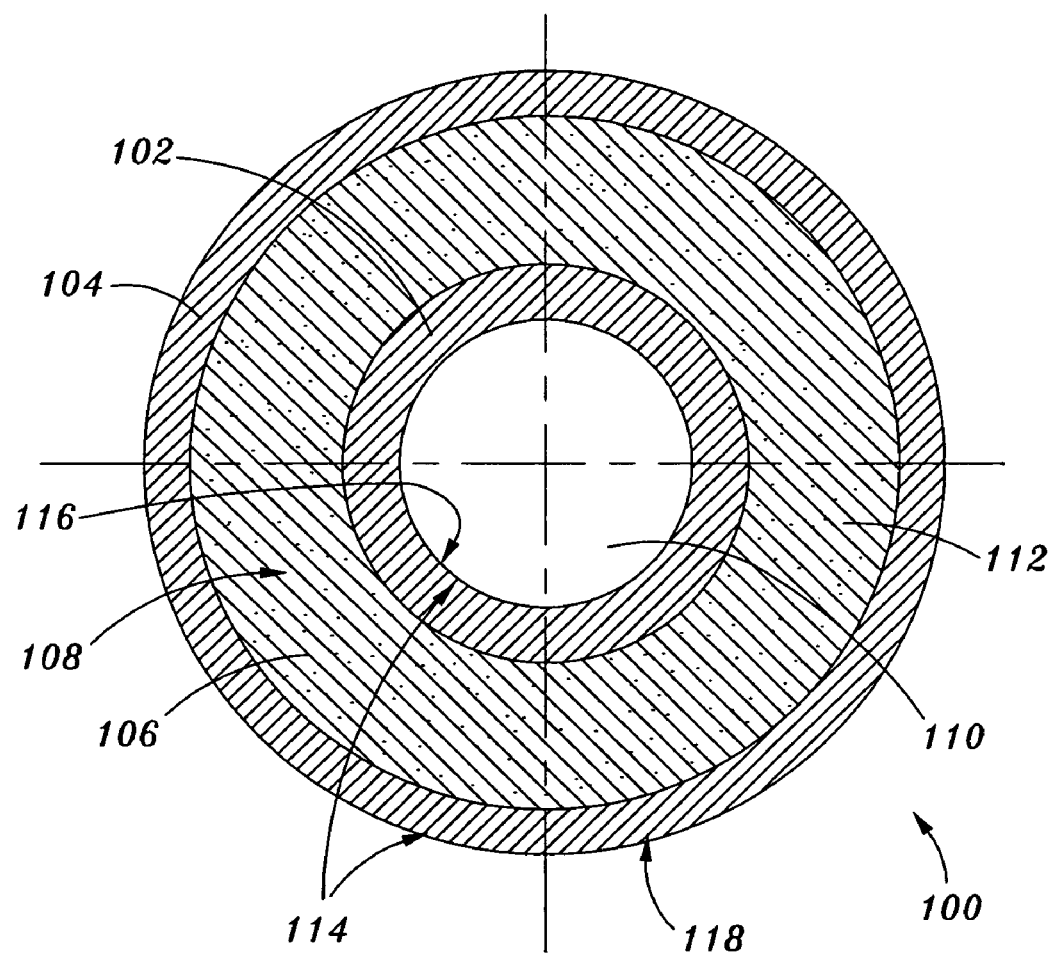
FIG. 1 is a schematic cross section for a tube-in-tube heat exchanger fabricated in accordance with one embodiment of the present invention.

Referring now to FIG. 1, a tube-in-tube heat exchanger 100 is illustrated that may be fabricated in accordance with one embodiment. The heat exchanger 100 may be made from two concentric tubes 102 and 104 of type 316L stainless steel. The outer tube 104 may have an outside diameter of 1.5 inches with a wall thickness of 0.035 inch. The inner tube 102 may have an outside diameter of 0.75 inch with a 0.035 inch wall thickness. Copper foam 106 may be provided so as to fill the annular space 108 between tubes 102 and 104. Copper foam 106 may improve the heat transfer between thermal fluid 110 and palladium particles 112 contained within the open cell of the copper foam 106. Copper foam may be selected because of copper's high thermal conductivity. The copper foam 106 may be comprised of an open cell reticulated structure of open, duodecahedronal (twelve sided, three-dimensional) shaped cells connected by continuous, solid metal ligaments. The relative density of the foam versus solid copper may be about 6.5-9.5%. The open structure void space may be designed to accommodate and support the palladium coated particles 112 that allow separation of isotopes to occur.

An aluminide coating 114 permeation barrier may provided on the internal surface 116 of the inner tube 102 and on the external surface 118 of the outer tube 104. The aluminide coating 114 may be provided as known in the art, for example, to minimize contamination of the thermal fluid 110 and the space surrounding heat exchanger 100, which may be encased in a vacuum jacket (not shown). The presence of aluminide coating 114, however, may affect the process of brazing copper foam 106 to inner tube 102. For example, it is desirable, so that neither the braze nor the coating is adversely affected by the subsequent processing, to braze at a temperature that is lower than the coating temperature of about 800° C. Above 800° C., inter-diffusion of the coating with the alloy substrate may occur and the surface aluminum content of the aluminide coating 114 begins to be reduced, significantly degrading the intended function of the aluminide coating 114. In an alternative embodiment, such as the use of copper foam 106 as cooling fins described above, the heat exchanger 100 may appear as shown in FIG. 1 with the exception that outer tube 104 may be absent and lack of aluminide coating 114 may make the use of an alternative high temperature braze appropriate.

Figure 2:
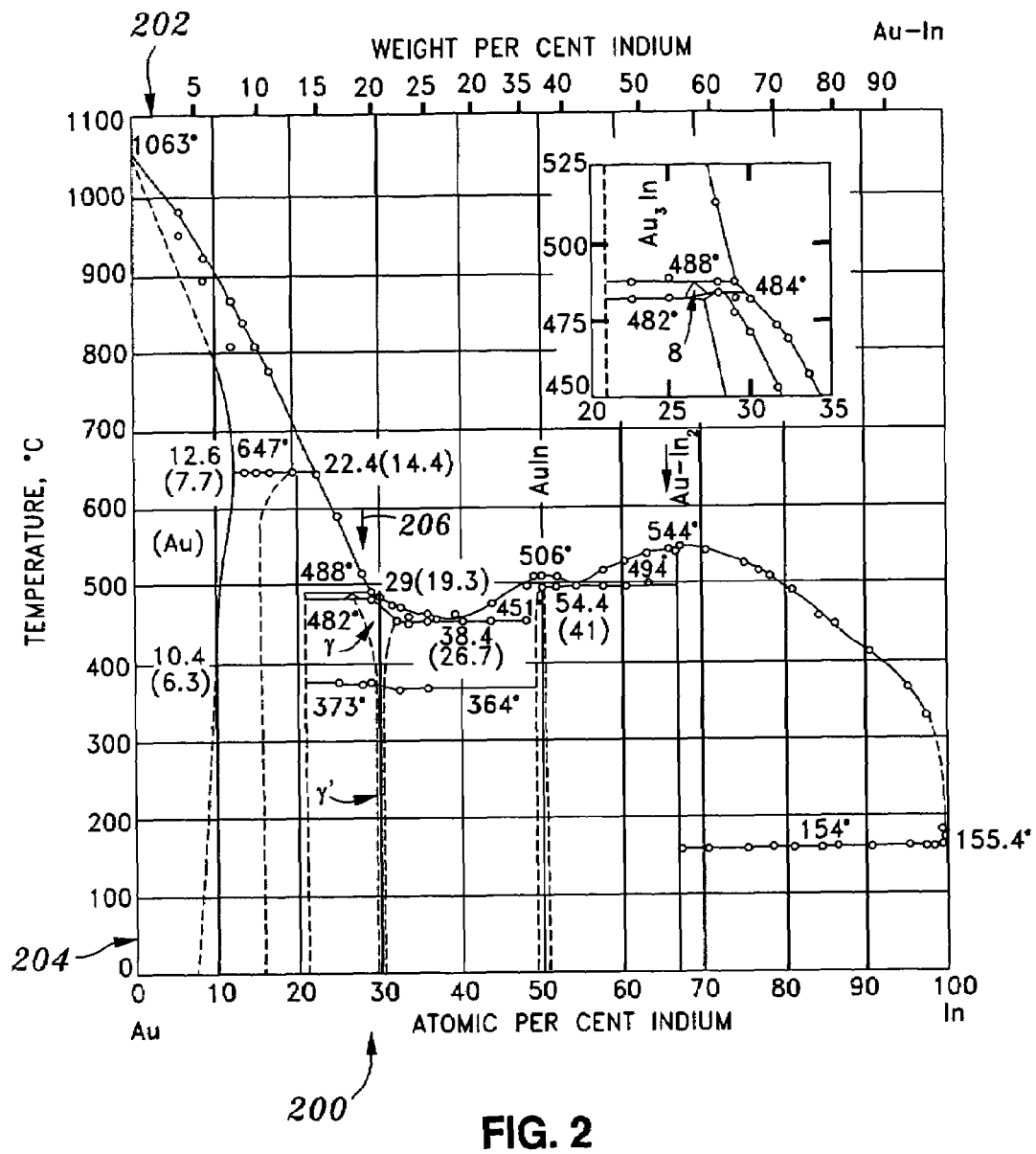
FIG. 2 is a gold-indium phase diagram for a brazing alloy composition in accordance with an embodiment of the present invention.

FIG. 2 shows a phase diagram 200 for a gold-indium brazing alloy composition. Horizontal scale 202 shows relative composition of the gold-indium brazing alloy by percentage of the weight of indium contained in the alloy so that, for example, the value 20 on horizontal scale 202 represents a composition of 20% by weight indium and 80% by weight gold. Vertical scale 204 represents the temperature of a gold-indium alloy in degrees Celsius (° C.). Arrow 206 shows the approximate location on the phase diagram 200 selected for the braze alloy according to one embodiment. As can be seen in FIG. 2, arrow 206 represents an alloy melting brazing temperature of approximately 550° C. with a gold-indium brazing alloy composition that may be approximately 18% by weight indium (and 82% by weight gold). The 18% indium-82% gold alloy composition may be referred to as "Au-18 In". At the region in phase diagram 200 indicated by arrow 206, the indium plating should be completely melted, allowing indium diffusion into and subsequent alloying with the gold plating. Complete alloying should result in an all "Au-18 In" liquid alloy, with subsequent flow between the stainless steel and the contacting filaments of the copper foam. Until full alloying is achieved, lower concentrations of Au-In alloy may be in a "mushy" phase transition between liquid and solid.

There are number of factors affecting the efficacy of using a particular alloy composition—such as Au-18 In. Those factors may include, for example, 1) minimizing total braze thickness to supply the small quantity of braze required for the open foam structure, 2) ensuring well bonded braze pre-placement, 3) minimizing braze erosion and filament undercutting, 4) maximizing final foam contact to inner and outer tube walls, and 5) minimizing brazing temperature.

Figure 3:
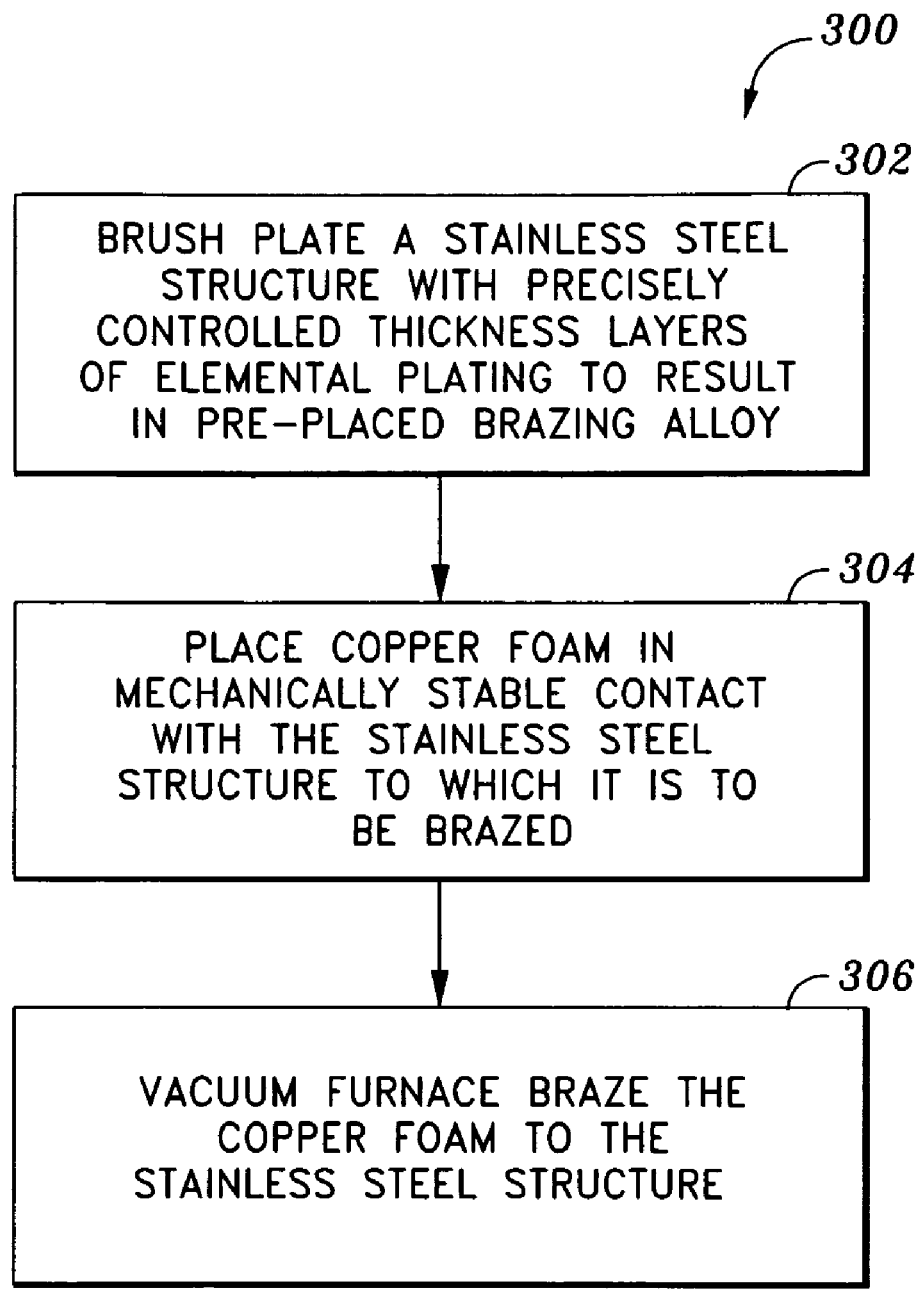
FIG. 3 is a flow chart illustrating a method for brazing copper foam to stainless steel, in accordance with an embodiment of the present invention.

Referring now to FIG. 3, an exemplary embodiment of a method 300 for vacuum furnace brazing cooper foam to stainless steel is illustrated by a flowchart. The exemplary method 300 may include steps 302, 304, and 306, which delineate method 300 for purposes of illustration according to one embodiment. Method 300 is illustrated with reference to FIGS. 1 and 2.

Method 300 may begin with a step 302, in which a stainless steel structure—such as stainless steel inner tube 102, after plating a layer of nickel called nickel striking to improve wettability, may be brush plated with elemental indium followed by elemental gold to form the layers needed for making a low temperature brazing alloy, i.e., a brazing alloy that is capable of being brazed at a low temperature (less than 700° C.)—such as Au-18 In. In an alterative embodiment, a stainless steel structure, such as stainless steel inner tube 102, after plating a layer of nickel called nickel striking to improve wettability, may be brush plated with elemental gold followed by elemental copper to form the layers needed for making a high temperature brazing alloy, i.e., a brazing alloy that is capable of being brazed at a high temperature (above 960° C.)—such as a brazing alloy composition that is 45% by weight gold and 55% by weight copper (45 Au-55 Cu).

In order to control the small amount (thin layer) of braze alloy, which may be significantly smaller and thinner compared to the prior art, electroplating, specifically brush electroplating, may be used to coat the stainless steel structures or tubes to be brazed. The braze amount may be precisely controlled by the bush plating process as may be described using Faraday's equation:

$$w = I*t*M/(n*F)$$

where w is the weight plated in grams (g), I is the current in Amperes (A), M is the atomic mass of the metal, n is the valence of the metal ion, t is the time in seconds (s) and F is Faraday's constant (96,500 coulombs). Very thin layers of braze material can be applied by controlling the amount of plating time and current to regulate the amount of braze material deposited. The alloy composition can be modified by plating different materials in layers and changing the relative thickness of the layers. Thus, brazing alloys can be developed by plating controlled thicknesses of appropriate elements.

The stainless steel may be plated with a very thin 1.3 micron (μm) (0.00005 inch) nickel strike, or flash coat to activate the surface of the steel. For example, the stainless steel may be prepared with a Woods metal strike, as known in the art, which may include a hydrochloric acid dip cleaning to remove native oxides from the surface of the stainless steel, followed by the nickel strike, which may help improve wettability over the native oxides that still remain so that the alloy plating may adhere better to the surface of the stainless steel. In general, the nickel may be expected not to melt and alloy with the braze material at the braze temperatures (Ni melts at 1455° C.) used so that the effect of nickel becoming a significant part of the braze alloys need not be considered.

For the low temperature braze, i.e., 440-640° C., the order of braze element application is important for effective production of the braze alloy. For the AU-In braze, the higher melting constituent, i.e, gold, should be on the surface, that is, the gold constituent should be brush plated after the indium constituent of the brazing alloy. The Au-18 In alloy may be formed by brush electroplating the nickel strike to a targeted thickness of 1.3 μm (0.00005 inch), then the indium to a targeted thickness of 1.47 μm (0.000058 inch), and then the gold to a targeted thickness of 2.54 μm (0.0001 inch). The order of brush plating the indium and then gold constituents of the brazing alloy may minimize the likelihood of erosion during brazing. The gold over indium braze configuration may also lead to less "pooling" of braze and may be more abrasion resistant during assembly of the copper foam to the stainless steel, as the gold is harder and more abrasion resistant than the indium.

In an alternative embodiment, with a high temperature braze, in order to achieve the appropriate compositions, the 45 Au-55 Cu braze alloy may be formed by applying, i.e., brush electroplating, the nickel strike to a targeted thickness of 1.3 μm (0.00005 inch), followed by the targeted thickness of 2.54 μm (0.0001 inch) of gold, and topped with the targeted thickness of 6.6 μm (0.00026 inch) of copper. The order of application of the gold and then copper may minimize the likelihood of erosion during brazing. The 45 Au-55 Cu braze alloy has a melting range of approximately 960-990° C. and the nominal brazing temperature may be 980° C.

Method 300 may continue with a step 304, in which the copper foam may be positioned in mechanically stable contact with the braze on the stainless steel structure to which it is to be brazed. For example, in the TnT TCAP heat exchanger, such as heat exchanger 100, copper foam 106 may be provided in the form of rings, shaped like "doughnuts" with square edges, that are pushed onto stainless steel inner tube 102, as shown in cross-section in FIG. 1. The rings may be interference fit on the 0.75 inch diameter inner tube 102, for example, which may assist in providing mechanically stable contact between copper foam 106 and the brazing alloy on inner tube 102. Sizing mandrels may be used to adjust the inner and outer diameter of the copper foam 106 rings for tubing contact without unnecessary deformation of copper foam 106. The assembly of outer tube 104 with copper foam 106 and inner tube 102 may provide further mechanical support of copper foam 106 in contact with inner tube 102, for example. Additional assembly of components germane to the formation of a heat exchanger—such as heat exchanger 100—for example, attachment of elbows and other fittings to tubes 102 and 104 may also be performed.

Method 300 may continue with a step 306 of vacuum furnace brazing the copper foam to the stainless steel structure. For example, the assembly of inner tube 102, copper foam 106, and outer tube 104 may be cleaned, placed in a vacuum furnace, heated, and cooled in order to braze copper foam 106 to stainless steel inner tube 102 and bond the copper foam 106 to the stainless steel inner tube 102. Cleanliness of the components and structures to be brazed, i.e., the assembly of inner tube 102, copper foam 106, and outer tube 104 may be ensured by cleaning in 100% ethyl alcohol, as the commercial grade of alcohol has sufficient water, up to 5%, to actively corrode the copper foam and cause discoloration. For vacuum furnace brazing of the copper foam to stainless steel, a maximum pressure of $10^{-5}$ Torr may be maintained in the vacuum furnace. The assembly may be heated at prescribed heating rates and the heating and cooling rates may be carefully controlled to optimize the brazing conditions to form a bond of the copper foam to the stainless steel.

For the low temperature braze, the brazing temperature may range from 500 to 650° C. For a nominal, or targeted, brazing temperature of 550° C., for example, the heating and cooling cycle may be controlled according to a programmed rate so that heating and cooling rates are targeted not to exceed the rates specified below, comprising a number of steps as follows:

1) heat from room temperature to 150° C. at 20° C./minute, hold 30 minutes,
2) heat from 150 to 530° C. at 20° C./minute, no hold,
3) heat from 530 to 550° C. at 3° C./minute, hold 15 minutes,
4) cool from 550 down to 100° C., cool at 20° C./minute or slower.

The low temperature braze may be used when the aluminide coating 114 is applied prior to the brazing operation. In alterative embodiments, for example, where aluminide coatings are not used, or are applied after brazing, the high temperature braze using the 45 Au-55 Cu braze alloy may be used. The 45 Au-55 Cu braze alloy has a melting range of 960-990° C. and the nominal brazing temperature may be 980° C. For a nominal, or targeted, brazing temperature of 980° C., for example, the heating and cooling cycle may be controlled according to a programmed rate, similar to that described above, so that heating and cooling rates are targeted to not exceed the rates specified below, comprising a number of steps as follows:

1) heat from room temperature to 960° C. at 20° C./minute,
2) heat from 960 to 970° C. at 10° C./minute,
3) heat from 970 to 980° C. at 5° C./minute,
4) hold at 980° C. (±5° C.) for 3 minutes,
5) cool from 980 down to 100° C., cool at 20° C./minute or slower.

It should be understood, of course, that the foregoing relates to preferred embodiments of the invention and that modifications may be made without departing from the spirit and scope of the invention as set forth in the following claims.

We claim:

1. A method for brazing copper foam to stainless steel tubing comprising the steps of:

brush plating layers for a brazing alloy onto said stainless steel tubing wherein said plated layers comprise gold and indium;

positioning said copper foam in mechanically stable contact with at least one of said plated layers of said brazing alloy on said stainless steel tubing; and heating said copper foam, said plated layers of said brazing alloy wherein said plated layers comprise gold and indium, and said stainless steel tubing in a vacuum furnace at a rate not exceeding a targeted 20° C. per minute to a targeted 530° C.;

heating said copper foam, said plated layers of said brazing alloy wherein said plated layers comprise gold and indium, and said stainless steel tubing in a vacuum furnace from said targeted 530° C. to 550° C. at 3° C. per minute;

holding said copper foam, said plated layers of said brazing alloy wherein said plated layers comprise gold and indium, and said stainless steel tubing at said targeted 550° C. for 15 minutes; and cooling said copper foam, a resultant brazing alloy, and said stainless steel tubing in a vacuum furnace from said targeted 550° C. down to 100° C. at a targeted rate not exceeding 20° C. per minute.

2. A method for brazing copper foam to stainless steel tubing comprising the steps of:

brush plating layers for a brazing alloy onto said stainless steel tubing wherein said plated layers comprise gold and copper;

positioning said copper foam in mechanically stable contact with at least one of said plated layers of said brazing alloy on said stainless steel tubing;

heating said copper foam, said plated layers of said brazing alloy wherein said plated layers comprise gold and copper, and said stainless steel structure in a vacuum furnace at a targeted rate not exceeding 20° C. per minute to a targeted 970° C.;

heating said copper foam, said plated layers of said brazing alloy wherein said plated layers comprise gold and copper, and said stainless steel structure in a vacuum furnace from said targeted 970° C. to 980° C. at 5° C. per minute;

holding said copper foam, said plated layers of said brazing alloy, and said stainless steel structure at said targeted 980° C. for 3 minutes; and cooling said copper foam, a resultant brazing alloy, and said stainless steel tubing in a vacuum furnace from said targeted 980° C. down to 100° C. at a rate not exceeding a targeted 20° C. per minute.

3. A method for brazing an open cell reticulated copper foam to stainless steel tubing, comprising the steps of:

brush electroplating plated layers for a brazing alloy onto said stainless steel tubing wherein said plated layers are comprised of gold and indium;

positioning said open cell reticulated copper foam in mechanically stable contact with said plated layers of said brazing alloy on said stainless steel tubing;

heating said open cell reticulated copper foam, said plated layers for said brazing alloy wherein said layers are comprised of gold and indium and said stainless steel tubing in a vacuum furnace from room temperature to a targeted 150° C. at 20° C. per minute;

holding said open cell reticulated copper foam, said plated layers for said gold-indium brazing alloy, and said stainless steel tubing at the targeted 150° C. for 30 minutes;

heating said open cell reticulated copper foam, said plated layers for said brazing alloy wherein said layers are comprised of gold and indium and said stainless steel tubing in a vacuum furnace from said targeted 150° C. to a targeted 530° C. at 20° C. per minute;

heating said open cell reticulated copper foam, said plated layers for said brazing alloy wherein said layers are comprised of gold and indium and said stainless steel tubing in a vacuum furnace from the targeted 530° C. to a targeted 550° C. at 3° C. per minute;

holding said open cell reticulated copper foam, said plated layers for said gold-indium brazing alloy, and said stainless steel tubing at said targeted 550° C. for 15 minutes; and cooling said open cell reticulated copper foam, a resultant gold-indium brazing alloy, and said stainless steel tubing in a vacuum furnace from said targeted 550° C. down to 100° C. at a rate not exceeding 20° C. per minute.

4. A method for brazing an open cell reticulated copper foam to stainless steel tubing, comprising the steps of:

brush electroplating plated layers for a brazing alloy onto said stainless steel tubing wherein said plated layers are comprised of gold and copper;

positioning said open cell reticulated copper foam in mechanically stable contact with said plated layers for said brazing alloy on said stainless steel tubing;

heating said open cell reticulated copper foam, said plated layers for said brazing alloy wherein said layers are comprised of gold and copper and said stainless steel tubing in a vacuum furnace from room temperature to a targeted 960° C. at 20° C. per minute;

heating said open cell reticulated copper foam, said plated layers for said brazing alloy wherein said layers are comprised of gold and copper and said stainless steel tubing in a vacuum furnace from said targeted 960° C. to a targeted 970° C. at 10° C. per minute;

heating said open cell reticulated copper foam, said plated layers for said brazing alloy wherein said layers are comprised of gold and copper and said stainless steel tubing in a vacuum furnace from said targeted 970° C. to a targeted 980° C. at 5° C. per minute;

holding said open cell reticulated copper foam, said plated layers for said brazing alloy wherein said layers are comprised of gold and copper and said stainless steel tubing in a vacuum furnace to a targeted 980° C. (±5° C.) for 3 minutes; and cooling said open cell reticulated copper foam, a resultant gold-copper brazing alloy, and said stainless steel tubing in a vacuum furnace from said targeted 980° C. down to 100° C. at a rate not exceeding 20° C. per minute.

* * * * *